US011975544B2

(12) United States Patent
Arakawa

(10) Patent No.: US 11,975,544 B2
(45) Date of Patent: May 7, 2024

(54) LIQUID-PRINTING APPARATUS

(71) Applicant: BROTHER KOGYO KABUSHIKI KAISHA, Nagoya (JP)

(72) Inventor: Yuta Arakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 141 days.

(21) Appl. No.: 17/825,203

(22) Filed: May 26, 2022

(65) Prior Publication Data

US 2022/0379625 A1 Dec. 1, 2022

(30) Foreign Application Priority Data

May 28, 2021 (JP) ................................ 2021-089854

(51) Int. Cl.
*B41J 2/175* (2006.01)
*B41J 25/00* (2006.01)

(52) U.S. Cl.
CPC ......... *B41J 2/17566* (2013.01); *B41J 25/006* (2013.01)

(58) Field of Classification Search
CPC ............................ B41J 2/17566; B41J 25/006
See application file for complete search history.

(56) References Cited

U.S. PATENT DOCUMENTS

| | | | | |
|---|---|---|---|---|
| 5,873,663 | A * | 2/1999 | Yokoi | B41J 19/202 400/279 |
| 9,498,990 | B2 * | 11/2016 | Fukuda | B41J 2/175 |
| 2002/0075340 | A1 * | 6/2002 | Moriyama | B41J 2/17566 347/14 |
| 2007/0127967 | A1 * | 6/2007 | Sasao | B41J 19/30 400/323 |

FOREIGN PATENT DOCUMENTS

| | | |
|---|---|---|
| JP | 2000-309110 A | 11/2000 |
| JP | 2006-289876 A | 10/2006 |

* cited by examiner

*Primary Examiner* — Jason S Uhlenhake
(74) *Attorney, Agent, or Firm* — Scully, Scott, Murphy & Presser, PC

(57) ABSTRACT

A liquid-printing apparatus, having a conveyer, a printing head, a liquid storage, a carriage, a scanning assembly, a remaining amount detector, and a controller, is provided. The printing head prints an image in a printing area ranging from a print-start position to a print-finish position along a scanning direction. The scanning assembly performs pass actions to move the carriage from a scan-start position to a scan-terminal position along the scanning direction. The remaining amount detector detects an amount of the liquid in the liquid storage. The controller controls the scanning assembly to perform a first pass action in a setting such that the scan-terminal position for the first pass action is separated farther in the scanning direction, in proportion to largeness of the amount of the liquid in the liquid storage, from one of the printing area for the first pass action and the printing area for a second pass action.

7 Claims, 5 Drawing Sheets

LIQUID-PRINTING APPARATUS

CROSS REFERENCE TO RELATED APPLICATIONS

This application claims priority under 35 U.S.C. § 119 from Japanese Patent Application No. 2021-089854, filed on May 28, 2021, the entire subject matter of which is incorporated herein by reference.

BACKGROUND

The present disclosure is related to a liquid-printing apparatus capable of determining a position for a carriage to stop scanning with reference to a weight of a head.

A liquid-printing apparatus in an on-carriage style, in which a printing head for discharging ink at a sheet and an ink tank storing the ink are mounted on a carriage, is known. In the liquid-printing apparatus of the on-carriage style, a weight and a barycentric position of the carriage assembly including the printing head and the ink tank may vary depending on an amount of the ink remaining in the ink tank. As the weight and the barycentric position of the on-carriage assembly varies from moment to moment, a posture of the printing head and an amount of an electric current required for accelerating the carriage may vary; therefore, and the carriage may not be controlled uniformly.

For example, an inkjet recording apparatus, which may control a motor to drive a carriage differently depending on an amount of ink remaining in an ink tank to regulate landing positions of droplets of the ink on a sheet to a constant position, is known. In this inkjet recording apparatus, even after the amount of the ink remaining in the ink tank is reduced, driving data to drive the motor may be adjusted according to the remaining amount of the ink. Therefore, regardless of the amount of the ink remaining in the ink tank, the landing positions of the ink may be regulated, and images may be formed continuously preferably.

For another example, an inkjet recording apparatus, in which positions to start applying braking voltage to a motor to drive a carriage may be adjusted according to predetermined adjustment values related to stopping positions for the carriage, is known. With this adjustment, deviation of the actual stopping positions of the carriage with respect to aimed stopping positions due to the varying remaining amount of the ink may be suppressed, and accuracy of the stopping positions of the carriage may be improved.

SUMMARY

Meanwhile, in the known inkjet recording apparatuses, while the carriage starts moving from a stationary state and accelerates, the posture of the printing head on the carriage may change. The posture of the printing head may not recover to a preferable posture before the printing head reaches a print-start position where the printing head starts discharging the ink. In such a condition, the printing head may discharge the ink in a less preferable posture while the carriage moves at a constant speed from the print-start position in a printing area, and the ink may land on less preferable positions. Accordingly, a printing quality of the inkjet recording apparatuses may be lowered.

Moreover, when the weight of the on-carriage assembly increases, acceleration or deceleration of the carriage may require a larger amount of current than an amount allowed to the inkjet recording apparatus. In such a condition where the larger amount of current is demanded, driving of the carriage may not be correctly controlled. In order to avoid such a situation, it may be considered that a longer moving distance for the carriage to accelerate or decelerate may be reserved. However, if the moving distance for the carriage is extended regardless of the weight of the on-carriage assembly, printable performance of the inkjet recording apparatuses may be lowered.

The present disclosure is advantageous in that a liquid-printing apparatus, by which difficulty in control of driving a carriage due to a demand for overcurrent may be restrained, while printing quality may be restrained from lowering and printing performance may be improved, is provided.

According to an aspect of the present disclosure, a liquid-printing apparatus, having a conveyer, a printing head, a liquid storage, a carriage, a scanning assembly, a remaining amount detector, and a controller, is provided. The conveyer is configured to convey a recording medium in a conveying direction. The printing head is configured to print an image by discharging liquid at the recording medium in a printing area ranging from a print-start position to a print-finish position along a scanning direction. The scanning direction intersects with the conveying direction. The liquid storage is configured to store the liquid. The carriage supports the printing head and the liquid storage. The scanning assembly is configured to perform pass actions, in each of which the carriage is moved in a range including the printing area from a scan-start position to a scan-terminal position along the scanning direction. The remaining amount detector is configured to detect an amount of the liquid remaining in the liquid storage. The controller is configured to control the scanning assembly to perform a first pass action being one of the pass actions in a setting such that the scan-terminal position for the first pass action is separated farther, in proportion to largeness of the amount of the liquid remaining in the liquid storage detected by the remaining amount detector, in the scanning direction from one of the printing area for the first pass action and the printing area for a second pass action being a next one of the pass actions following the first pass action.

DETAILED DESCRIPTION

Figure 1:
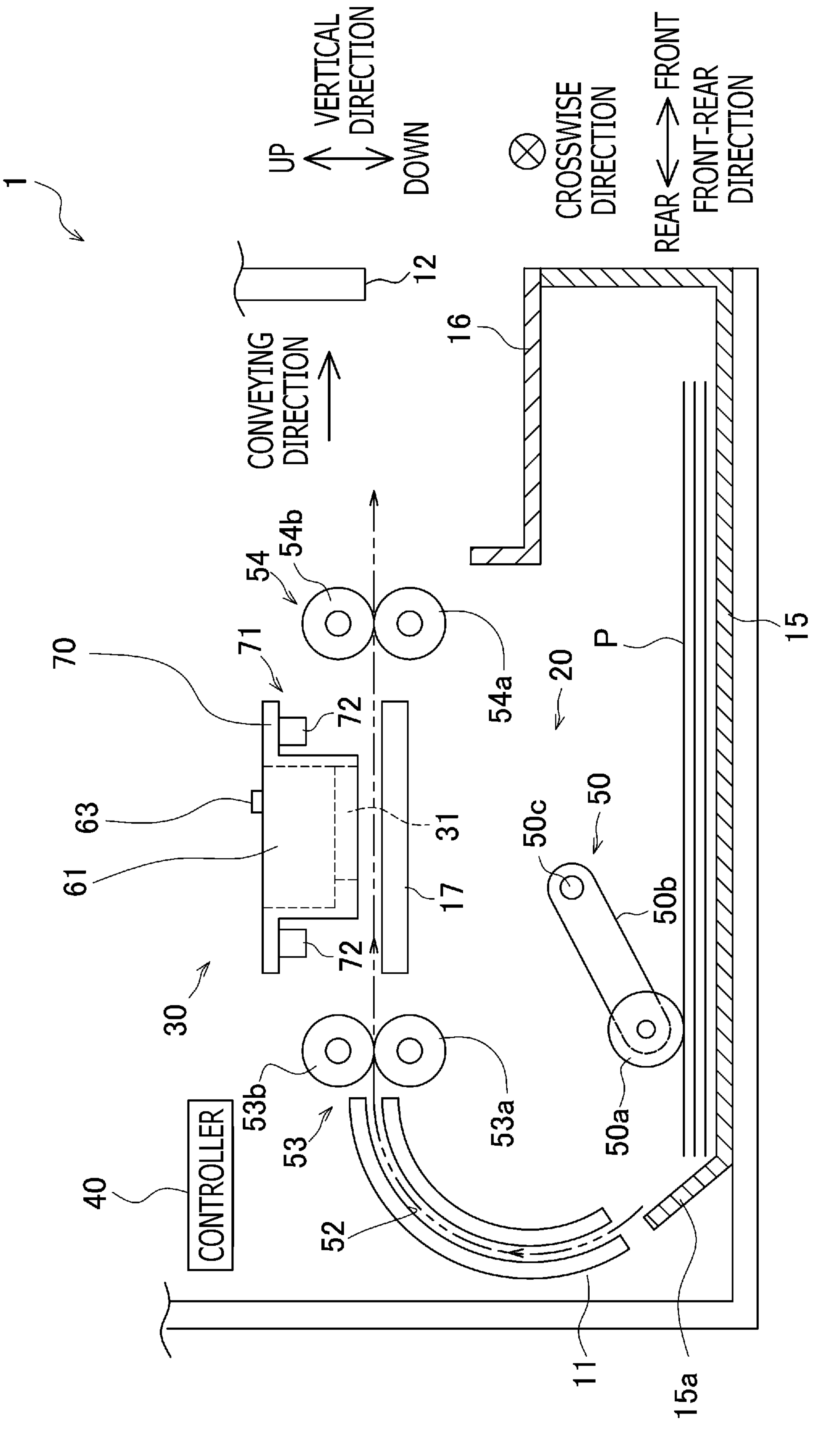
FIG. 1 is a cross-sectional side view to illustrate an inner structure in a printer according to an embodiment of the present disclosure.
Figure 2:
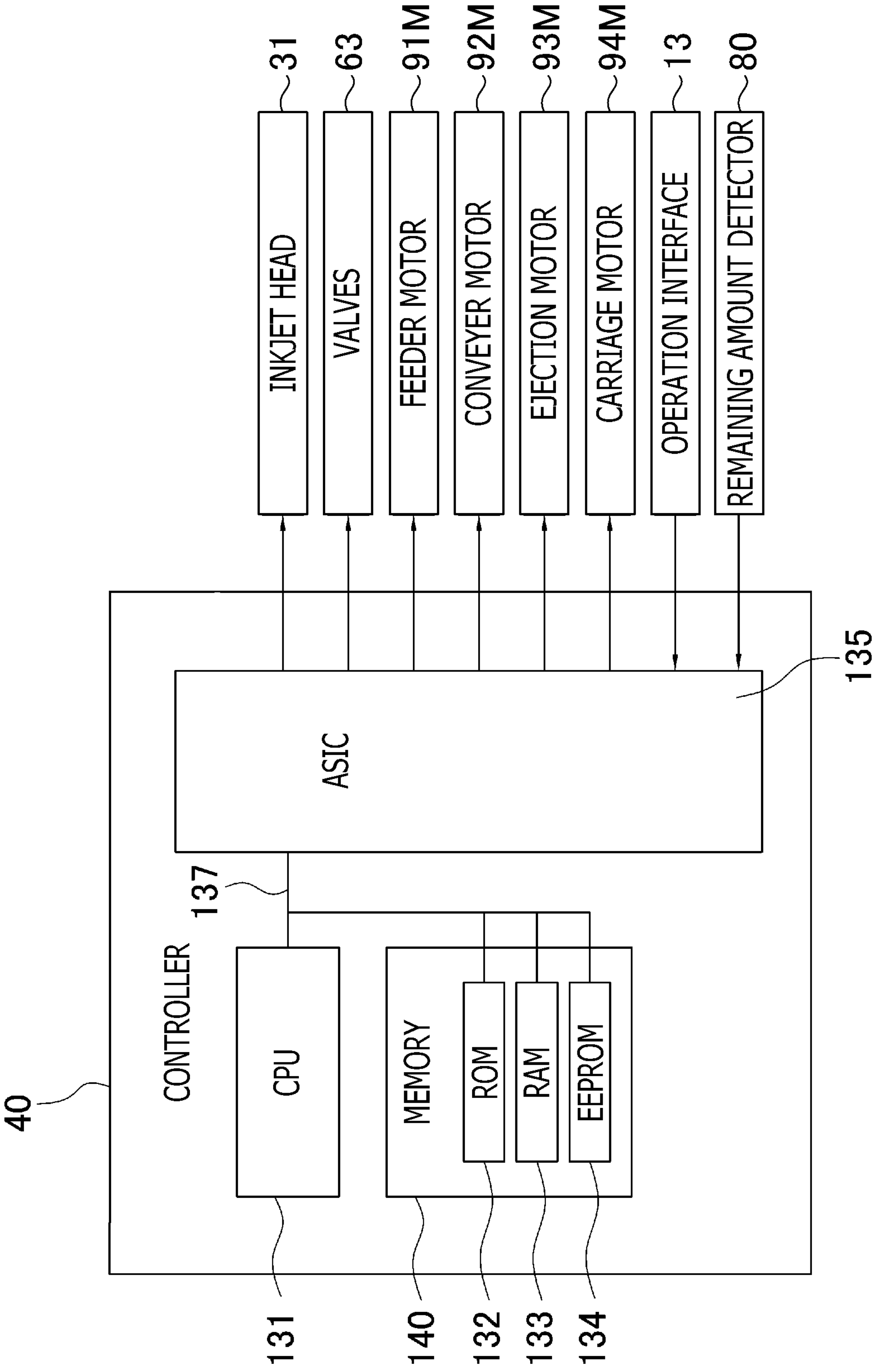
FIG. 2 is a block diagram to illustrate an electrical configuration of the printer according to the embodiment of the present disclosure.

In the following paragraphs, with reference to FIGS. 1-5, a printer 1 according to an embodiment of the present disclosure will be described. It is noted that the printer described below is merely one embodiment of the present disclosure, and various connections may be set forth between elements in the following description. These connections in general and, unless specified otherwise, may be direct or indirect and that this specification is not intended to be limiting in this respect. In the description below, an up-to-down or down-to-up direction, a right-to-left or left-to-right direction, and a front-to-rear or rear-to-front direction in FIG. 1 will be defined as a vertical direction, a crosswise direction, and a front-rear direction of the printer 1, respectively.

(Configuration of Printer 1)

The printer 1 has a housing 11, which may be in a form of an approximately rectangular box. On a front face of the housing, an opening 12 is formed. On an upper face of the housing 11, an operation interface 13 is arranged (see FIG. 2). The operation interface 3 includes buttons, which may be operated to enter settings for printing operations, and a liquid crystal display, through which various types of information may be displayed. In the present embodiment, the operation interface 13 has buttons, which may be operated to enter settings for printing operations; however, optionally, the operation interface 13 may have a touch panel that may serve as both the buttons and the liquid crystal display.

The printer 1 includes, as shown in FIG. 1, a feeder tray 15, an ejection tray 16, a conveyer 20, a recorder 30, a remaining amount detector 80 (see FIG. 2), and a controller 40. The feeder tray 15, the ejection tray 16, the conveyer 20, the remaining amount detector 80, and the controller 40 are accommodated in the housing 11.

The feeder tray 15 may store and support a plurality of stacked sheets P therein. The feeder tray 15 may be pushed inward and pulled outward through the opening 12 along the front-rear direction. In other words, the feeder tray 15 is detachable from and attachable to the housing 11. At a rear end of the feeder tray 15, a slant board 15*a* is arranged. The slant board 15*a* may guide the sheet P to a conveyer path 52 when the sheet P is fed from the stack of sheets P on the feeder tray 15 by a feeder roller 50*a*. The conveyer path 52 and the feeder roller 50*a* will be described further below.

The ejection tray 16 may accommodate the sheets P, on which images are printable by an inkjet head 31 in the recorder 30. The inkjet head 31 will be described further below. The ejection tray 16 is located at a frontward upper position with respect to the feeder tray 15 and may move along with the feeder tray 15 when the feeder tray 15 is detached from or attached to the housing 11.

The conveyer 20 includes a feeder 50, the conveyer path 52, a conveyer roller pair 53, and an ejection roller pair 54. The feeder 50 may, as shown in FIG. 1, feed the sheet P from the stack of sheets P on the feeder tray 15 to the conveyer path 52. The conveyer roller pair 53 may convey the sheet P fed by the feeder 50 to the recorder 30. The recorder 30 may be, for example, an inkjet-styled recording device, and may record an image on the sheet P conveyed by the conveyer roller pair 53. The ejection roller pair 54 may convey the sheet P with the image recorded thereon by the recorder 30 to the ejection tray 16 to eject outside the housing 11.

The feeder 50 is, as shown in FIG. 1, located at an upper position with respect to the feeder tray 15. The feeder 50 includes a feeder roller 50*a* and an arm 50*b*. The feeder roller 50*a* is rotatably supported by the arm 50*b* at one end of the arm 50*b*. The arm 50*b* is rotatably supported by a supporting shaft 50*c* at the other end thereof and is urged downward by, for example, a spring to urge the feeder roller 50*a* against the feeder tray 15. The arm 50*b* is retractable upward when the feeder tray 15 is detached from or attached to the housing 11. The feeder roller 50*a* may be driven by a feeder motor 91M (see FIG. 2) to rotate; thereby one of the sheet P stacked on the feeder tray 15 may be fed to the conveyer path 52.

The conveyer path 52 is formed inside the housing 11, extending from a rearward position in the feeder tray 15 and curving upper-frontward to the front side of the printer 1. The sheet P fed from the feeder tray 15 may be guided in the conveyer path 52, turning in U from down to up, to the recorder 30.

The conveyer roller pair 53 includes a conveyer roller 53*a* located at a lower position and a pinch roller 53*b* located at an upper position. The conveyer roller 53*a* may be driven by a conveyer motor 92M (see FIG. 2) and rotate. The pinch roller 53*b* may be rotated along with the rotation of the conveyer roller 53*a*. The conveyer roller 53*a* and the pinch roller 53*b* may cooperate to nip the sheet P from below and above and convey the sheet P to the recorder 30.

The ejection roller pair 54 includes an ejection roller 54*a* located at a lower position and a spur roller 54*b* located at an upper position. The ejection roller 54*a* may be driven by an ejection motor 93M (see FIG. 2) and rotate. The spur roller 54*b* may be rotated along with the rotation of the ejection roller 54*a*. The ejection roller 54*a* and the spur roller 54*b* may cooperate to nip the sheet P from below and above and convey the sheet P to the ejection tray 16.

It may be noted in the present embodiment that a conveying direction of the sheet P is a direction, in which the sheet P may be conveyed from the feeder tray 15 by the conveyer 20, and includes a direction indicated by an arrow with dash-and-dots line in FIG. 1. More specifically, the conveying direction of the sheet P is a direction, in which the sheet P may be conveyed rearward from the frontside by the feeder roller 50*a*, guided by the conveyer path 52 to make a U-turn, and conveyed frontward from the rear side by the conveyer roller pair 53 and the ejection roller pair 54.

The recorder 30 includes, as shown in FIG. 1, an inkjet head 31, four (4) ink tanks 61, a carriage 70, a scanning assembly 71, and a platen 17. The carriage 70 may reciprocate along a scanning direction, which may be the crosswise direction or a direction intersecting with the conveying direction of the sheet P. The inkjet head 31 and the ink tanks 61 are supported by the carriage 70. In other words, the printer 1 according to the present embodiment is in a so-called on-carriage style, in which the ink tanks 61 and the inkjet head 31 are mounted on the carriage 70. The ink tanks 61 in the present embodiment are located to be entirely higher than the inkjet head 31. Optionally, however, the ink tanks 61 may be located to be partly higher than an upper face of the inkjet head 31 while a part of the ink tanks 61 may be located to be lower than the lower face of the inkjet head 31.

The four ink tanks 61 may store inks in four different colors, which are magenta (M), cyan (C), yellow (Y), and black (K). Each of the ink tanks 61 has a valve 63, by which an ink-refilling port (not shown) is opened or closed. The valve 63 may be, for example, a bidirectional electromagnetic valve, in which a valve body may be moved by a solenoid being driven to open or close the ink-refilling port. When the valve 63 opens the ink-refilling port, the ink may be poured into the ink tank 61 through the ink-refilling port; and when the valve 63 closes the ink-refilling port, the ink may not be poured into the ink tank 61.

The inkjet head 31 has internal flow paths (not shown), through which the inks may be supplied from the ink tanks 61 to the inkjet head 31. Moreover, the inkjet head 31 may discharge the inks through a plurality of nozzles (not shown) formed on a bottom side thereof. In particular, the plurality of nozzles form nozzle arrays aligning along the conveying direction of the sheet P, which coincides with the front-rear direction, and the inks may be discharged through the plurality of nozzles.

The platen 17 is located at a lower position with respect to the inkjet head 31 and may support the sheet P being conveyed by the conveyer roller pair 53 from below. The platen 17 is arranged in an area, through which the sheet P being conveyed may pass, within a reciprocating range of the carriage 70. A width, e.g., a dimension in the crosswise direction, of the platen 17 is substantially larger than a maximum width of the sheet P that may be conveyed in the printer 1; therefore, the sheet P being conveyed 52 may always pass over the platen 17.

The scanning assembly 71 may perform a plurality of pass actions, in each of which the carriage 70 is moved along a scanning direction, e.g., the crosswise direction, from a scan-start position to a scan-terminal position, for printing an image. A scan-terminal position, at which the carriage 70 stops moving in one pass action, becomes a scan-start position for the carriage 70 to start moving in a next pass action. A scan-terminal position for each pass action may be determined by a controller 40, which will be described further below. In the present embodiment, in each pass action, the carriage 70 may make a round trip to move one way and the other way along the scanning direction. The scanning assembly 71 includes, as shown in FIG. 1, a pair of guide rails 72 and a belt-circulating assembly 73 (see FIG. 4). The pair of guide rails 72 are separated from each other in the front-rear direction and extend in the crosswise direction in parallel with each other. The carriage 70 is arranged over the pair of guide rails 72. The carriage 70 is connected with a carriage motor 94M (see FIG. 2) through the belt-circulating assembly 73. Therefore, when the carriage motor 94M is activated, the belt-circulating assembly 73 may run. Accordingly, the carriage 70 may move along the pair of guide rails 72 in the scanning direction, e.g., the crosswise direction, and the inkjet head 31 may move in the crosswise direction.

The inkjet head 31 may print an image on the sheet P by discharging the inks through the nozzles under the control of the controller 40 based on recording data in printing areas (see areas 100*a*, 100*b* in, for example, FIG. 3), each of which ranges from a print-start position to a print-finish position along the scanning direction, e.g., the crosswise direction. Thus, while the carriage 70 reciprocates in the crosswise direction, the inkjet head 31 may scan the printing areas on the sheet P, and the inks may be discharged through the nozzles; thereby an image may be recorded in the printing areas on the sheet P being conveyed over the platen 17.

The printing area is an area, in which a part of the image may be printed in a single pass action on the sheet P, inside a movable area for the inkjet head 31 along the scanning direction. The print-start position is a position, at which the inkjet head 31 starts printing the part of the image in the printing area on the sheet P. The print-finish position is a position, at which the inkjet head 31 finishes printing the part of the image in the printing area on the sheet P. In each pass action, the scanning assembly 71 starts moving the carriage 70 from the scan-start position and accelerates toward the print-start position; the scanning assembly 71 moves the carriage 70 through the printing area at a constant velocity; and the scanning assembly 71 decelerates the carriage 70 in a range from the print-finish position to the scan-terminal position. In the present embodiment, the controller 40 may control the scanning assembly 71 to perform the pass action for a plurality of times.

In the present embodiment, as described above, the carriage 70 makes a round trip along the scanning direction in a single pass action. Therefore, the print-start position and the print-finish position in a single pass action are a same position. Meanwhile, a position, at which the inkjet head 31 discontinues discharging of the inks temporally, is not considered as the print-finish position.

The printer 1 has a linear encoder (not show), in which a plurality of light-transmissive sections, e.g., slits, align spaced apart from one another along the scanning direction. On the other hand, the carriage 70 has a transmissive position-detecting sensor (not shown) having light-emitting elements and light-receiving elements. The printer 1 may recognize a latest position of the carriage 70 with regard to the scanning direction based on a counted values obtained through the light-transmissive sections in the linear encoder detected by the position-detecting sensor while the carriage 70 moves, and rotation of the carriage motor 94M may be controlled based on the position of the carriage 70.

The remaining amount detector 80 may detect an amount of the inks remaining in the ink tanks 61. More specifically, the remaining amount detector 80 may detect an amount of each ink remaining in each of the ink tanks 61. For example, the remaining amount detector 80 may be a sensor of sensor-and-arm style, which has a floating member (not shown) supported at an end of a swingable arm and an optical sensor (not shown) detectable of a position of the floating member in each of the ink tanks 61. The floating member may be a piece, of which specific gravity is smaller than the ink stored in the ink tank 61. The amount of the ink remaining in each ink tank 61 may be detected by detecting the position of the floating member with the optical sensor. Signals including information concerning the amount of the inks remaining in the ink tanks 61 detected by the remaining amount detector 80 may be transmitted to the controller 40. The remaining amount detector 80 may monitor the amount of the inks remaining in the ink tanks 61 either at all time or limitedly when signals, which indicate the ink tanks 61 need to be refilled, are received in the controller 40.

The controller 40 includes a Central Processing Unit (CPU) 131, an Application Specific Integrated Circuit (ASIC) 135, and a memory 140, which are connected through an internal bus 137. The memory 140 includes a Read Only Memory (ROM) 132, a Random Access Memory (RAM) 133, an Electrically Erasable Programmable Read-Only Memory (EEPROM) 134. The ROM 132 may store programs to be run when the controller 40 controls operations in the printer 1. The CPU 131 may run the programs with use of the RAM 133 and the EEPROM 134.

The ASIC 135 may output controlling signals to the devices in the printer 1 including the inkjet head 31, the valves 63, the feeder motor 91M, the conveyer motor 92M, the ejection motor 93M, and the carriage motor 94M to control behaviors of these devices. For example, the controller 40 may control the inkjet head 31, the feeder motor 91M, the conveyer motor 92M, the ejection motor 93M, the carriage motor 94 based on recording data transmitted from an external device, e.g., a PC, a smartphone, etc., to conduct a conveying process and a recording process alternatively to record the image on the sheet P. Meanwhile, the ASIC 135 may receive signals, including signals from the operation interface 13 and the remaining amount detector 80.

(Driving Control Over Carriage 70 Through Scanning Assembly 71)

Figure 3:
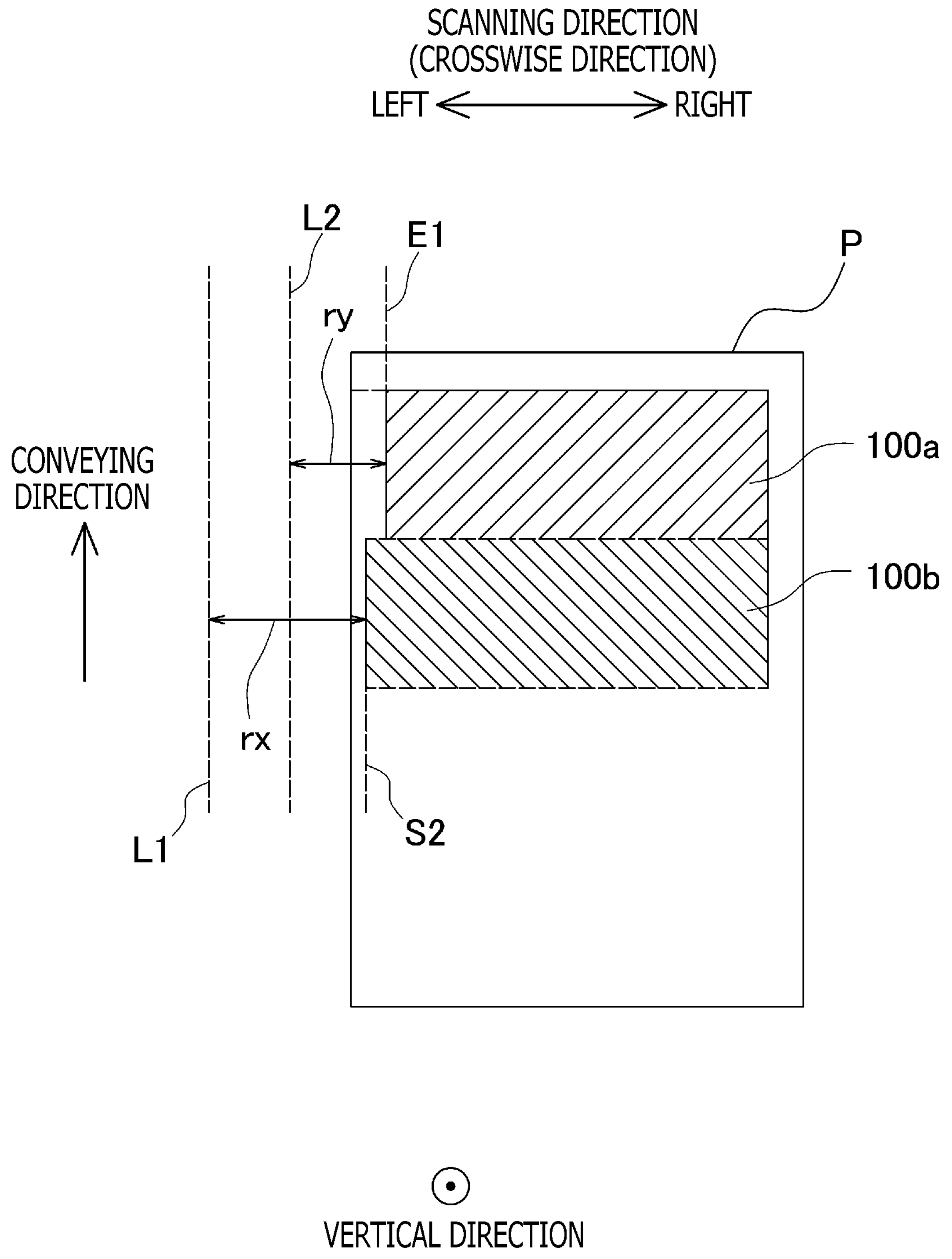
FIG. 3 is an illustrative view of printing areas for exemplary pass actions to an inkjet head in the printer according to the embodiment of the present disclosure.
Figure 4:
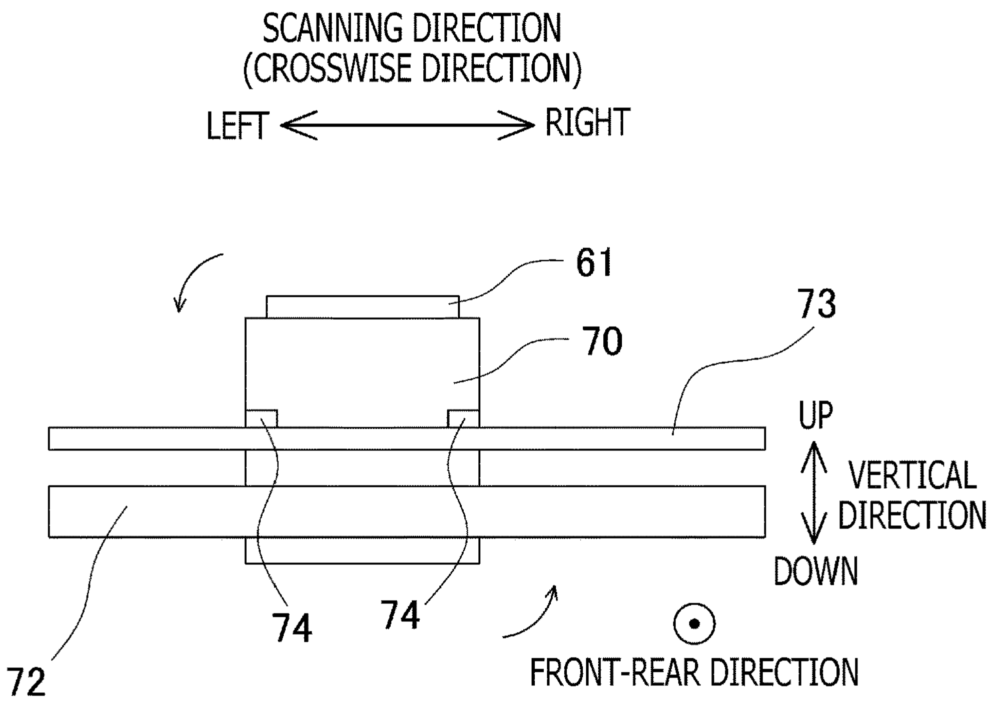
FIG. 4 is an illustrative front view of a carriage when the inkjet head is in a desirable printing posture according to the embodiment of the present disclosure.
Figure 5:
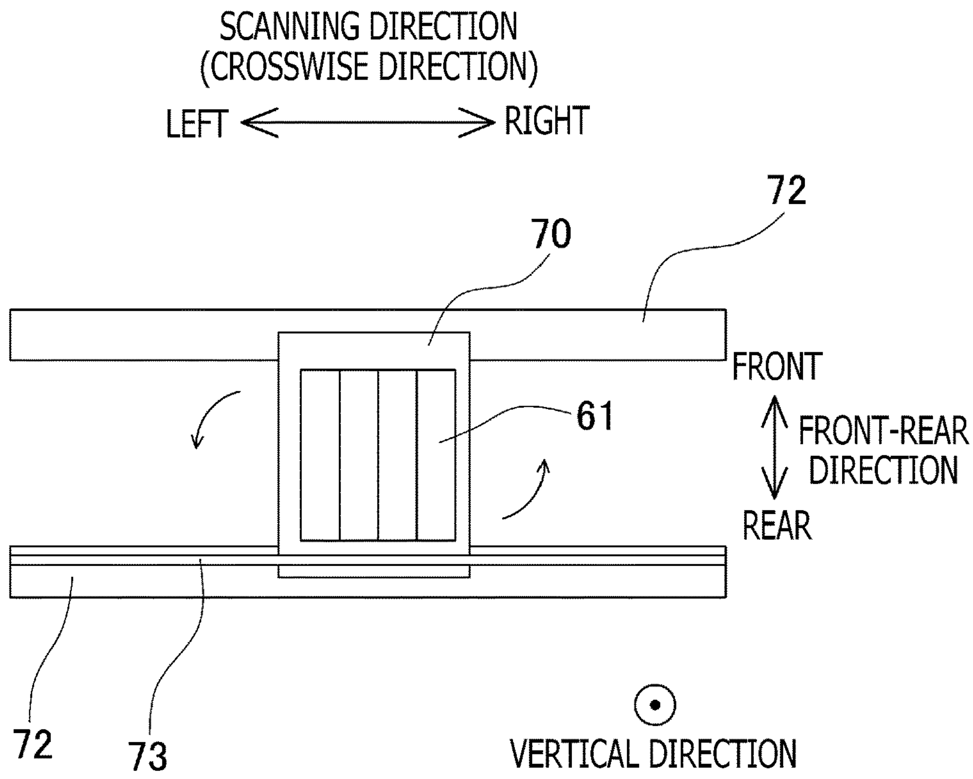
FIG. 5 is an illustrative top view of the carriage when the inkjet head is in the desirable printing posture according to the embodiment of the present disclosure.

Next, with reference to FIGS. 3-5, exemplary behaviors of the controller 40 to control the scanning assembly 71 to drive the carriage 70 will be described. In the following description, a printing area for a current pass action being one of a plurality of pass actions will be called as a first printing area 100*a*, and another printing area for a next pass action to follow the current pass action among the plurality of pass actions will be called as a second printing area 100*b*.

First, prior to the scanning assembly 71 performing the current pass action, the controller 40 obtains a first terminal position L1, which is separated by an acceleration distance rx from a print-start position S2 of the second printing area 100*b* for the next pass action. Moreover, the controller 40 obtains a second terminal position L2, which is separated by a deceleration distance ry from a print-finish position E1 of the first printing area 100*a* for the current pass action.

The acceleration distance rx is a distance, which is increased in proportion to largeness of the amount of the inks remaining in the ink tanks 61 detected by the remaining amount detector 80: the larger the amount of the inks remaining in the ink tanks 61 detected by the remaining amount detector 80 is, the longer the acceleration distance rx is. Moreover, the acceleration distance rx is a distance, which is necessary to cause the carriage 70 to be moving at an action velocity for the second printing area 100*b* by the time when the carriage 70, after starting to move from a stationary state and accelerating from the first terminal position L1, reaches the print-start position S2 of the second printing area 100*b*. The action velocity may be, for example, a predetermined constant velocity.

Moreover, the acceleration distance rx is a least distance necessary for the inkjet head 31 to recover to stand in a desirable printing posture while the carriage 70 moves from the first terminal position L1 to the print-start position S2. The desirable printing posture is a posture, in which the inkjet head 31 may discharge the inks at correct positions on the sheet P while the carriage 70 is moving over the second printing area 100*b* at the action velocity.

The desirable printing posture will be described further below. As shown in FIG. 4, the carriage 70 with the inkjet head 31 and the ink tanks 61 mounted thereon is supported by the belt-circulating assembly 73 through spring members 74. When the carriage 70 with the inkjet head 31 tilts, a force in a direction to restore the inkjet head 31 to the desirable printing posture may act on the carriage 70 through the spring members 74. Meanwhile, when the carriage 70 moving in the scanning direction accelerates, a force that tends to tilt the inkjet head 31 from the desirable printing posture may act on the carriage 70. The force caused by acceleration of the carriage 70 may increase in proportion to an acceleration rate: the larger the acceleration rate is, the greater force may act on the carriage 70. As the greater force due to the acceleration acts on the carriage 70, the carriage 70 may tilt with respect to the scanning direction, in a view along the front-rear direction (see arrows in solid lines in FIG. 4) or with respect to the front-rear direction, in a view along the vertical direction (see arrows in solid lines in FIG. 5). In this condition, the inkjet head 31 may not stand in the desirable printing posture, and a printing quality may be lowered.

For example, when the carriage 70 is moved from the stationary state at the first terminal position L1 accelerated rapidly in a shorter distance in order to cause the carriage 70 to be moving at the action velocity in the second printing area 100*b*, the inkjet head 31 may tilt by a larger angle. For another example, although the velocity of the carriage 70 may reach the action velocity, when a distance for the carriage 70 to move at the constant velocity before the carriage 70 reaches the print-start position S2 is insufficient, the inkjet head 31 may be restrained from recovering from the tilted posture to the desirable printing posture due to the force from the spring members 74. Therefore, in consideration of the force from the spring members 74 and the intensity of the force acting on the carriage 70 when the carriage 70 accelerates, a distance, by which rapid acceleration of the carriage 70 is restrained, and by which a substantial distance to move the inkjet head 31 at a constant velocity so that the inkjet head 31 may recover to the desirable printing posture while the carriage 70 moves from the first terminal position L1 to the print-start position S2 is reserved, is set as the acceleration distance rx. The force to act on the carriage 70 due to the acceleration of the carriage 70 is greater in proportion to largeness of the amount of the inks remaining in the ink tanks 61: the larger the amount of the inks remaining in the ink tanks 61 is, the greater force due to the acceleration of the carriage 70 acts on the carriage 70. Moreover, the carriage 70 tends to tilt by a larger angle as the barycentric position of the carriage 70, which depends on the amount of the inks remaining in the ink tanks 61, deviates more to one side. Therefore, it may be preferable that the acceleration distance rx is arranged in consideration of the weight and the barycenter of the carriage 70, which depends on the amount of the inks remaining in the ink tanks 61.

Moreover, the acceleration distance rx is a distance necessary for the carriage 70 to be moved from the first terminal position L1 and accelerated to move through the print-start position S2 at the action velocity for the second printing area 100*b* when a maximum allowable current is supplied to the scanning assembly 741. The maximum allowable current is a maximum current that may be supplied to the scanning assembly 71 and may be determined in advance.

The deceleration distance ry is a distance, which is increased in proportion to the amount of the inks remaining in the ink tanks 61 detected by the remaining amount detector 80: the larger the amount of the inks remaining in the ink tanks 61 is, the longer the deceleration distance ry becomes. Moreover, the deceleration distance ry is a distance necessary for stopping the carriage 70 when the carriage 70 is moving at the action velocity for the first printing area 100*a*. Further, the deceleration distance ry is a distance necessary for stopping the carriage 70 at the second terminal position L2 when the carriage 70 being moved from the print-finish position E1 of the first printing area 100*a* by the scanning assembly 71 with the maximum allowable current supplied thereto is decelerated.

Meanwhile, in the present embodiment, it may be preferable that the acceleration distance rx is a minimum value within a range that satisfies the conditions described above and that the deceleration distance ry is a minimum value within a range that satisfies the conditions described above. In other words, within a range, in which the carriage 70 may be accelerated and decelerated substantially suitably, it is preferable that the first terminal position L1 is as close as possible to the print-start position S2, and the second terminal position L2 is as close as possible to the print-finish position E1. In this arrangement, the carriage 70 may not necessarily be moved to travel a longer distance than it needs to, and a printing performance may be improved.

Next, the controller 40 may control the scanning assembly 71 and set one of the first terminal position L1 and the second terminal position L2, which is farther in the crosswise direction from the second printing area 100*b* for the next pass action, as the scan-terminal position in the scanning direction, i.e., the crosswise direction, for the carriage 70 in the current pass action. For example, as shown in FIG. 3, when the first terminal position L1 is farther than the second terminal position L2 from the second printing area 100*b*, the first terminal position L1 is set as the scan-terminal position for the carriage 70 in the current pass action to print the part of the image in the first printing area 100*a*.

Meanwhile, if no image is to be printed by the inkjet head 31 on the sheet P in the next pass action following the current pass action, the controller 40 may set the second terminal position L2 to be the scan-terminal position for the carriage 70 in the current pass action. In this occasion, the controller 40 may not compare which one of the first terminal position L1 and the second terminal position L2 is farther in the crosswise direction from the second printing area 100*b* for the next pass action.

As described above, the printer 1 according to the present embodiment has the conveyer 20, the inkjet head 31, the ink tanks 61 to store the inks, the carriage 70 to support the inkjet head 31 and the ink tanks 61, the scanning assembly 71, the remaining amount detector 80, and the controller 40. The controller 40 may control the scanning assembly 71 to perform the current pass action in the setting such that the scan-terminal position for the current pass action is separated farther in the scanning direction, e.g., the crosswise direction, in proportion to largeness of the amount of the inks remaining in the ink tanks 61 detected by the remaining amount detector 80, from one of the first printing area 100*a* for the current pass action and the second printing area 100*b* for the next pass action following the current pass action. According to the present embodiment, the scan-terminal position for the carriage 70 in the current pass action is located to be farther from the printing area in proportion to largeness of the amount of the inks remaining in the ink tanks 61: the larger the amount of the inks remaining in the ink tanks 61 is, the farther from the printing area the scan-terminal position for the carriage 70 in the pass action is located. Therefore, while the printing quality may be restrained from being lowered, and printing performance may be improved, difficulty in controlling the carriage 70 due to a demand for overcurrent may be restrained.

Further, according to the present embodiment, the controller 40 may obtain the first terminal position L1, which is separated from the print-start position S2 for the next pass action following the current pass action by the acceleration distance rx, and the second terminal position L2, which is separated from the print-finish position E1 of the current pass action by the deceleration distance ry. The acceleration distance rx is the distance, which is longer in proportion to largeness of the amount of the inks remaining in the ink tanks 61, and which is necessary for the carriage 70 to be moved through the print-start position S2 in the next pass action at the action velocity set to the second printing area 100*b*. Meanwhile, the deceleration distance ry is the distance, which is longer in proportion to largeness of the amount of the inks remaining in the ink tanks 61, and which is necessary for stopping the carriage 70 moving at the action velocity for the first printing area 100*a*. The controller 40 may control the scanning assembly 71 so that the carriage 70 may stop at the scan-terminal position, which is one of the first terminal position L1 and the second terminal position L2 farther from the second printing area 100*b* of the next pass action in the scanning direction, at the end of the current pass action.

According to the configuration described above, one of the first terminal position L1 and the second terminal position L2 farther from the printing area of the next pass action in the scanning direction is set to be the scan-terminal position for the carriage 70 for the current pass action. Therefore, in the next pass action following the current pass action, the acceleration distance rx and the deceleration distance ry for the carriage 70, which are increased in proportion to largeness of the amount of the inks remaining in the ink tanks 61, may be reserved reliably. Accordingly, the printing quality may be restrained from being lowered more effectively.

According to the embodiment described above, the acceleration distance rx is the distance necessary for the inkjet head 31 to recover to the desirable printing posture to work correctly in the second printing area 100*b* in the next pass action. According to the present embodiment, the scan-terminal position for the carriage 70 in the current pass action is set at the position, which enable the inkjet head 31 to stand in the desirable printing posture at the print-start position S2 for the next pass action. Therefore, as the carriage 70 moves through the print-start position S2 and enters the second printing area 100*b*, the inkjet head 31 may discharge the inks at correct positions on the sheet P, and the printing quality may be restrained from being lowered more reliably.

According to the embodiment described above, the acceleration distance rx is the distance necessary for moving the carriage 70, when the carriage 70 is moved from the first terminal position L1 and accelerated by the scanning assembly 71 with the maximum allowable current supplied thereto, to move through the print-start position S2 at the action velocity. In this arrangement, when the controller 40 controls the acceleration of the carriage 70 in order to move the carriage 70 through the print-start position S2 at the action velocity, the current to be supplied to the scanning assembly 71 may be restrained from exceeding the maximum allowable current. Therefore, difficulty in controlling the carriage 70 due to a demand for overcurrent may be restrained more effectively.

According to the embodiment described above, the deceleration distance ry is the distance necessary for stopping the carriage 70 at the second terminal position L2 when the carriage 70 moving through the print-finish position E1 is decelerated by the scanning assembly 71 with the maximum allowable current supplied thereto. In this arrangement, when the carriage 70 moving through the print-finish position E1 is controlled to decelerate in order to stop the carriage 70 at the second terminal position L2, the current to be supplied to the scanning assembly 71 may be restrained from exceeding the maximum allowable current. Therefore, difficulty in controlling the carriage 70 due to a demand for overcurrent may be restrained more effectively.

According to the embodiment described above, when an image is not to be printed by the inkjet head 31 on the sheet P in the next pass action following the current pass action, the scanning assembly 71 is controlled in a setting such that the second terminal position L2 is the scan-terminal position for the current pass action. When no image is to be printed by the inkjet head 31 on the sheet P in the next pass action following the current pass action, the acceleration distance rx for the carriage 70 in the next pass action may not need to be considered for determining the scan-terminal position. In other words, when no image is to be printed by the inkjet head 31 on the sheet P in the next pass action following the current pass action, the scan-terminal position for the carriage 70 may be determined in consideration of the deceleration distance ry alone, which depends on the amount of the inks remaining in the ink tanks 61. Therefore, without the necessity to consider the acceleration distance rx, driving control over the carriage 70 may be more simplified.

MODIFIED EXAMPLES

Although an example of carrying out the invention has been described, those skilled in the art will appreciate that there are numerous variations and permutations of the liquid-printing apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

Figure 6:
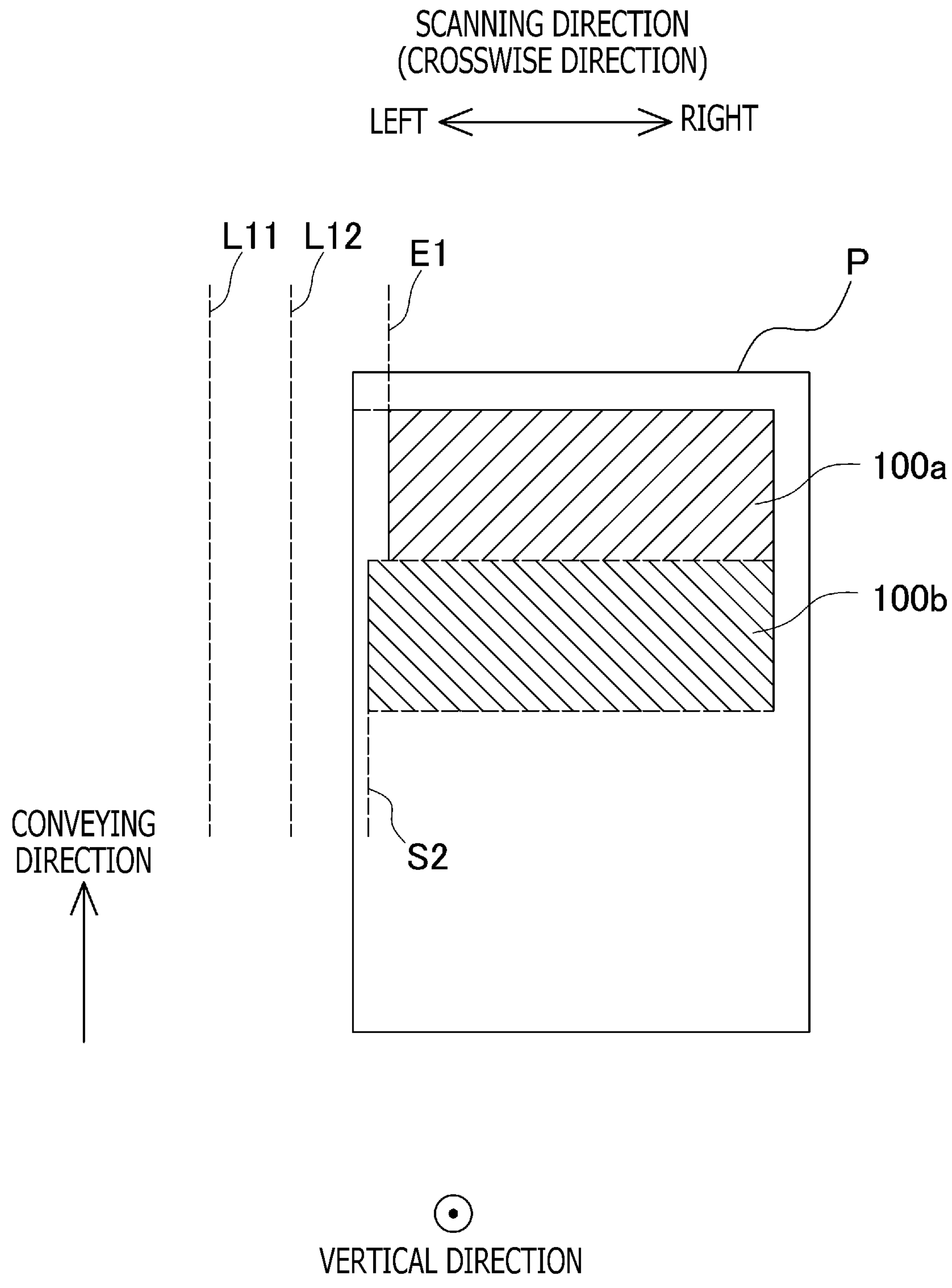
FIG. 6 is an illustrative view of printing areas for exemplary pass actions to an inkjet head in a printer according to a modified embodiment of the present disclosure.

For example, the controller 40 may determine the scan-terminal position for the carriage 70 based on a comparison between the amount of the inks remaining in the ink tanks 61 detected by the remaining amount detector 80 and at least one threshold value. The threshold value(s), a scan-terminal position when the amount of the inks remaining in the ink tanks 61 is greater than or equal to the threshold value(s), and a scan-terminal position when the amount of the inks remaining in the ink tanks 61 is smaller than the threshold value(s) may be set in advance. For example, when the amount of the inks remaining in the ink tanks 61 is larger than or equal to a predetermined threshold, the controller 40 may control the scanning assembly 71 in the current pass action in a setting such that the carriage 70 may stop at a scan-terminal position L11, as shown in FIG. 6, which is a scan-terminal position set in advance. As shown in FIG. 6, the scan-terminal position L11 is a position separated farther than the scan-terminal position L12 from either the second printing area 100*b* for the next pass action or the first printing area 100*a* in the current pass action. Optionally, the predetermined threshold value may not necessarily be limited to one but may include two or more threshold values. According to the modified example, the scan-terminal position may be determined easily based on a comparison between the amount of the inks remaining in the ink tanks 61 and the threshold value(s).

For another example, the controller 40 may control the scanning assembly 71 in a setting such that the scan-terminal position to stop the carriage 70 in the current pass to be a terminal position other than the second terminal position L2. For example, when a next action following the current pass action is an ink-refilling action or an ink-purging action, the controller 40 may determine the scan-terminal position for the carriage 70 in the current pass action in consideration of the position, at which the next action is to be performed.

For another example, containers to contain the inks and mounted on the carriage 70 may be ink cartridges. For another example, the embodiment described above may not necessarily be applied to the printer 1 but may be applied to, for example, a multifunction peripheral machine or a copier.

For another example, the remaining amount detector 80 may not necessarily be in the sensor-arm style but may be, for example, in a prism style. The remaining amount detector 80 in the prism style may have ink tanks 61 made of resin. Further, the remaining amount detector 80 may have infrared emitters, each of which emits an infrared ray at the inside of the ink tank 61 from the outside, and infrared receivers, each of which may detect the infrared ray reflected off the resin-made ink tank 61. In particular, when the ink is present at the position where the infrared ray hits, the infrared ray may proceed straight through an interface between the resin and the ink, and the infrared receiver may not detect the infrared ray. On the other hand, when the ink is absent at the position where the infrared ray hits, the infrared ray may be fully reflected off an interface between the resin and the air and may be detected by the infrared receiver. One or more pairs of the infrared emitter and the infrared receiver may be arranged at positions in each ink tank 61 optionally, and thereby the amount of the inks remaining in the ink tanks may be detected.

For another example, the remaining amount detector 80 may be in a soft-counter style. More specifically, the remaining amount detector 80 may have a counter, which may count values related to amounts of the inks having been discharged from the inkjet head 31 through the nozzles, and a calculator, which may calculate amounts of the inks remaining in the ink tanks 61 based on the values related to the amounts of the inks having been discharged from the inkjet head 31 counted by the counter. For example, the calculator may obtain the amount of the inks remaining in the ink tanks 61 by subtracting the value indicating the amount of the inks having been discharged through the nozzles from an amount of the inks in the ink tanks 61 immediately after shipping of the printer 1 or after refilling of the ink tanks 61. The obtained value may be overwritten in the EEPROM 134 and saved at all time. The amount of the inks remaining in the ink tanks 61 immediately after refilling of the ink tanks 61 may be obtained, for example, by adding an amount of the inks to refill the ink tanks 61 to the latest amount of the inks remaining in the ink tanks 61 before the refilling.

For another example, the current pass action and the next pass action following the current pass action may be performed on separated sheets P. For another example, a single pass action may be a one-way trip of the carriage 70 along the scanning direction. In this arrangement, the print-start position may be located on one side of the printing area in the scanning direction, and the print-finish position may be located on the other side of the printing area in the scanning direction.

What is claimed is:

1. A liquid-printing apparatus, comprising:

a conveyer configured to convey a recording medium in a conveying direction;

a printing head configured to print an image by discharging liquid at the recording medium in a printing area ranging from a print-start position to a print-finish position along a scanning direction, the scanning direction intersecting with the conveying direction;

a liquid storage configured to store the liquid;

a carriage supporting the printing head and the liquid storage;

a scanning assembly configured to perform pass actions, in each of which the carriage is moved in a range including the printing area from a scan-start position to a scan-terminal position along the scanning direction;

a remaining amount detector configured to detect an amount of the liquid remaining in the liquid storage; and a controller configured to control the scanning assembly to perform a first pass action being one of the pass actions in a setting such that the scan-terminal position for the first pass action is separated farther, in proportion to largeness of the amount of the liquid remaining in the liquid storage detected by the remaining amount detector, in the scanning direction from one of the printing area for the first pass action and the printing area for a second pass action being a next one of the pass actions following the first pass action.

2. The liquid-printing apparatus according to claim 1, wherein the controller is configured to:

obtain a first terminal position, the first terminal position being separated from the print-start position for the second pass action by an acceleration distance, the acceleration distance being longer in proportion to the largeness of the amount of the liquid remaining in the liquid storage, the acceleration distance being a distance necessary for the carriage to be moved through the print-start position for the first pass action at an action velocity set to the printing area;

obtain a second terminal position, the second terminal position being separated from the print-finish position for the first pass action by a deceleration distance, the deceleration distance being longer in proportion to the largeness of the amount of the liquid remaining in the liquid storage, the deceleration distance being a distance necessary for the carriage moving at the action velocity to stop; and control the scanning assembly to perform the first pass action in a setting such that one of the first terminal position and the second terminal position farther from the printing area for the second pass action in the scanning direction is the scan-terminal position for the first pass action.

3. The liquid-printing apparatus according to claim 2, wherein the acceleration distance is a distance necessary for the printing head to stand in a desirable printing posture for the printing area in the second pass action on the carriage moving from the first terminal position to the print-start position for the second pass action.

4. The liquid-printing apparatus according to claim 2, wherein the acceleration distance is a distance necessary for the carriage to be moved from the first terminal position and accelerated to move through the print-start position at the action velocity by the scanning assembly when a maximum allowable current is applied to the scanning assembly.

5. The liquid-printing apparatus according to claim 2, wherein the deceleration distance is a distance necessary for stopping the carriage at the second terminal position when the carriage being moved from the print-finish position by the scanning assembly with a maximum allowable current supplied thereto is decelerated.

6. The liquid-printing apparatus according to claim 2, wherein, when the image is not to be printed on the recording medium by the printing head in the second pass action, the controller is configured to control the scanning assembly in the first pass action in a setting such that the second terminal position is the scan-terminal position for the carriage.

7. The liquid-printing apparatus according to claim 1, wherein the controller is configured to determine the scan-terminal position for the carriage based on a comparison between the amount of the liquid remaining in the liquid storage detected by the remaining amount detector and at least one threshold value.

* * * * *